US009550549B1

(12) United States Patent
Ratigan et al.

(10) Patent No.: US 9,550,549 B1
(45) Date of Patent: Jan. 24, 2017

(54) ROPE CUFF

(71) Applicants: Edward Ratigan, Graham, NC (US); Michael Ratigan, Graham, NC (US)

(72) Inventors: Edward Ratigan, Graham, NC (US); Michael Ratigan, Graham, NC (US)

(73) Assignee: Fjord, Inc., Graham, NC (US)

( * ) Notice: Subject to any disclaimer, the term of this patent is extended or adjusted under 35 U.S.C. 154(b) by 235 days.

(21) Appl. No.: 14/474,552

(22) Filed: Sep. 2, 2014

(51) Int. Cl.
*B63B 21/04* (2006.01)
*F16G 11/12* (2006.01)
*B63B 21/00* (2006.01)

(52) U.S. Cl.
CPC .............. *B63B 21/04* (2013.01); *F16G 11/12* (2013.01); *B63B 2021/003* (2013.01)

(58) Field of Classification Search
CPC ........................... B63B 21/20; B63B 2021/203
See application file for complete search history.

(56) References Cited

U.S. PATENT DOCUMENTS

| 5,901,756 A * | 5/1999 | Goodrich | F16L 3/233 138/110 |
| 2011/0059325 A1 * | 3/2011 | Juan | B32B 5/26 428/458 |

OTHER PUBLICATIONS

Assignee's Co-pending U.S. Appl. No. 13/655,655, filed Oct. 19, 2012 of Edward Ratigan entitled "Mooring Line Cover and Method", (Specification, Abstract and Drawing Figs. 1-2—11 pgs.
Twelve (12) page brochure from Samson showing "Innovative Chafe Protection Solutions and Hardware for High-Performance Ropes"; Copyright 2011 Samson Rope Technologies, Inc.

* cited by examiner

*Primary Examiner* — Edwin Swinehart
(74) *Attorney, Agent, or Firm* — Blake P. Hurt; Tuggle Duggins P.A.

(57) ABSTRACT

A rope cuff including a plurality of shoring lines attached to an interior surface and covered with an interior flap formed from a material with a high coefficient of friction is provided. The shoring lines are braided around a mooring line to serve as a chafe guard and the interior flap frictionally engages the mooring line to maintain both the chafe guard and the cuff in appropriate positions. An adjustable hook and loop strap is attached to the exterior surface of the rope cuff to constrict the cuff around the mooring line and provide further frictional engagement between the interior of the rope cuff and the mooring line.

16 Claims, 4 Drawing Sheets

ROPE CUFF

FIELD OF THE INVENTION

The invention herein pertains to protective covers and particularly pertains to a protective cover for mooring lines used to secure nautical vessels and the like.

DESCRIPTION OF THE PRIOR ART AND OBJECTIONS OF THE INVENTION

Mooring lines are used to secure large machines such as yachts to support structures like docks or buoys. Mooring lines must be able to withstand large tensile loads, should be resilient, must not react chemically with water, and should have relatively long fatigue life despite repeated cycles of stress and relaxation. As used herein, the term "mooring line" is known in the art to encompass any line used in the marine field for the control of loads to which it is attached, for example in towing or the act of mooring a vessel to a dock. A mooring line typically includes two sections: a linear section that can stretch hundreds of feet (meters) in length, and a loop section that is sized to extend over a mooring post affixed to the dock, known as a bollard.

In addition to requiring sufficient tensile strength to secure a vessel, mooring lines also must withstand prolonged abrasive cycles that result from friction produced from a boat bobbing on the water surface. This friction causes wearing over time that can lead to the mooring line breaking during use, allowing a docked vessel to float away and become a hazard to itself and others. By preventing friction on the line, the structural integrity of the mooring line can be greatly prolonged and overall maritime safety can be increased. While various line covers have been used in the past, they have often been ineffective due to positioning problems whereby the cover slides away from the eyelet or linear sections of the line, exposing the section in question to wear. To combat this issue, braided covers may be installed via splicing in either a loose or tight configuration over the surface of a mooring line to prevent rope abrasion. However, the splicing installation incurs significant cost and may take significant time to perform, and the tight configuration requires cutting or removal to inspect the structural integrity of the rope underneath.

Thus, in view of the problems and disadvantages associated with prior art devices, the present invention was conceived and one of its objectives is to provide an adjustable mooring line abrasion guard.

It is another objective of the present invention to provide a guard for the linear section of the mooring line that is simple to manufacture and quick to install.

It is still another objective of the present invention to provide an adjustable cuff with a plurality of shoring lines braided about a main mooring line.

It is yet another objective of the present invention to provide a mooring line cuff with a section of material defining a high coefficient of friction to prevent displacement of a mooring line held within.

It is a further objective of the present invention to provide a mooring line cuff with an adjustable fastener that can be tightened around a mooring line.

It is still a further objective of the present invention to provide a cuff with a plurality of shoring lines affixed thereto.

It is yet a further objective of the present invention to provide a chafe guard that may be removed to inspect the mooring line underneath without damaging the guard and the line.

It is yet another objective of the present invention to provide a method of protecting the linear section of a mooring line with an adjustable and removable chafe guard cuff.

Various other objectives and advantages of the present invention will become apparent to those skilled in the art as a more detailed description is set forth below.

SUMMARY OF THE INVENTION

The aforesaid and other objectives are realized by providing a mooring line rope cuff formed from an exterior material such as woven nylon and a section of interior material with a high coefficient of friction for engaging the surface of a mooring line. A plurality of shoring lines are affixed to an interior surface of the cuff and braided around the exterior of a mooring line, which is inserted within the cuff, frictionally engaged by the high coefficient of friction material, and secured with a ring and a strap formed from hook and loop material attached to the cuff exterior surface. The braided shoring lines serve to reduce the friction and abrasion imparted on the mooring line, for example when the mooring line passes by or rubs against a dock surface.

DETAILED DESCRIPTION OF THE PREFERRED EMBODIMENT AND OPERATION OF THE INVENTION

Figure 1:
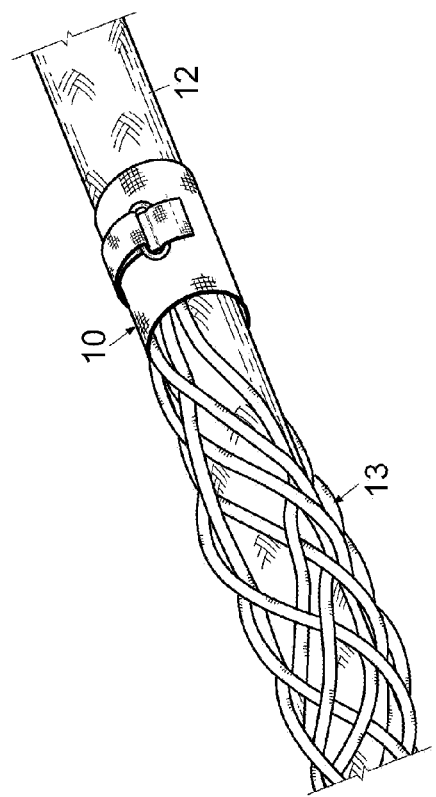
FIG. 1 shows a schematic side view of a pair of mooring line cuffs engaged to a mooring line of indeterminate length.
Figure 1:
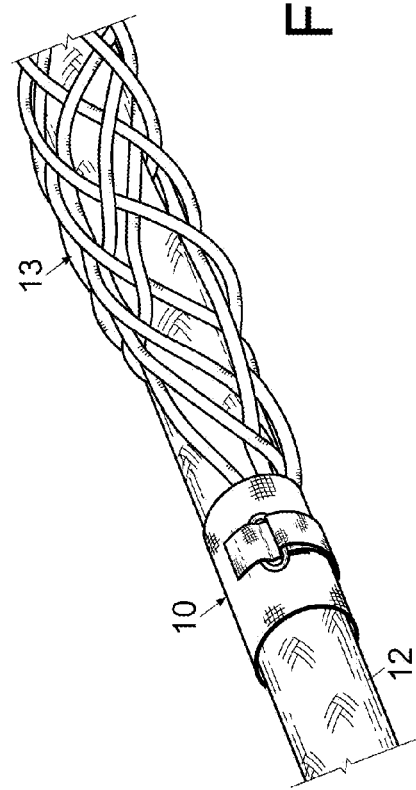

For a better understanding of the invention and its operation, turning now to the drawings, FIG. 1 illustrates a pair of mooring line cuffs 10 installed on mooring line 12, represented with break lines to signify indeterminate length. As would be understood, shoring lines 13 are braided around the exterior of mooring line 12 to reduce the friction imparted by docks or other mounting surfaces on mooring line 12, for example when a ship (not shown) is secured in port and moves with the tides. Although a single rope cuff 10 may be utilized, with the opposing ends of shoring lines 13 interwoven into the body of mooring line 12 as is known in the art, such is not preferred as it is extremely difficult, time-consuming, and expensive to weave shoring lines 13 in this manner.

Figure 2:
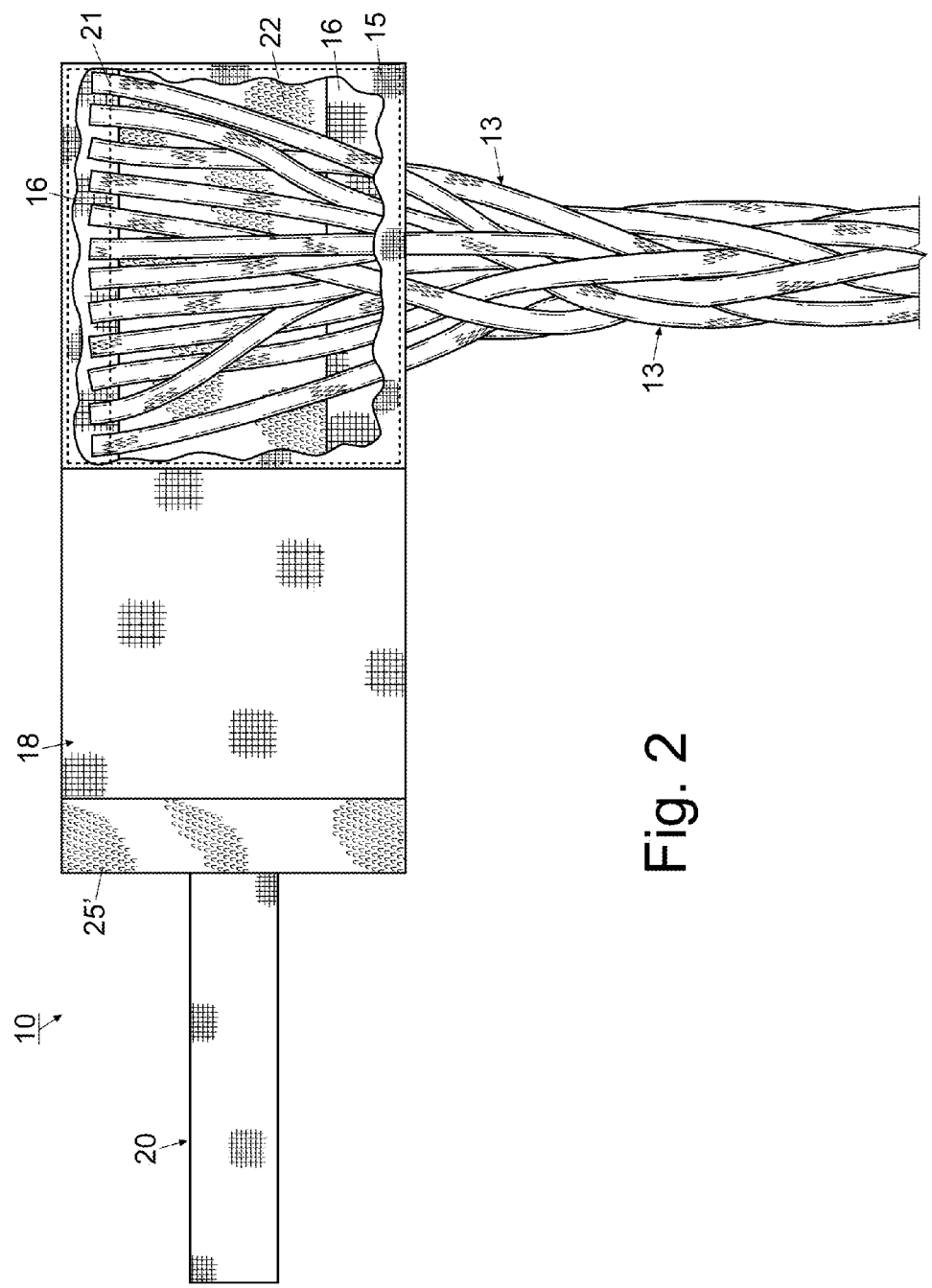
FIG. 2 pictures a front plan view of a mooring line cuff without a mooring line engaged and in the open position.

FIG. 2 illustrates an interior (i.e. mooring line 12 proximal) front plan view of rope cuff 10 with a portion of interior flap 15 cut away to show the attachment of shoring lines 13 to cuff interior 16. Preferably, interior flap 15 is a rectangular section of a material with a coefficient of friction high enough to substantially prevent longitudinal displacement of mooring line 12 from rope cuff 10 once engaged (see FIGS. 1 and 4). For example, hook and loop material (referred to commercially as Velcro™) can mechanically engage the surface of mooring line 12, particularly the hook portion, via hundreds of tiny hook structures. When strap 20 is engaged tightly as described in greater detail with respect to FIG. 3, the frictional engagement between interior flap 15 and mooring line 12 is greatly increased. However, given the pliable composition of the hook structures and the wetness of the engagement surface, interior flap 15 is preferably formed by a gripping material such as that commercially offered by 3M™, for example 3M product number GM640 which defines a plurality of gripping fingers (not shown) that securely engage mooring line 12, even in wet or oily environments. It should be understood that discussion of hook and loop and 3M™ gripping materials are but two examples of acceptable materials forming interior flap 15 and nothing in their use as examples should be used to limit the scope of interior flap 15, as other materials may serve as interior flap 15 as well. Interior flap 15 may fold over cuff interior 16, covering and securing shoring lines 13 therebetween and further may be affixed to cuff interior 16 to prevent inadvertent disengagement, for example by fastener, stitching, adhesive, or the like (not shown). Shoring lines 13 may also be attached beneath interior flap 15 in a number of methods, but preferably may be sewn into engagement with cuff 10 as represented by stitches 21. If a more robust engagement is desired, an embodiment of rope cuff 10 may further include hook material 22 to frictionally engage shoring lines 13.

FIG. 2 also displays cuff base 18 oriented in a laterally opposing position relative to interior flap 15. Cuff base 18 may be integrally formed with cuff exterior 17 (FIG. 3), or cuff base 18 may be a separate component of rope cuff 10. While the material of cuff exterior 17 and cuff base 18 may be any that can withstand repeated soaking and frictional forces, a polymeric blend such as a nylon weave is preferred.

Figure 3:
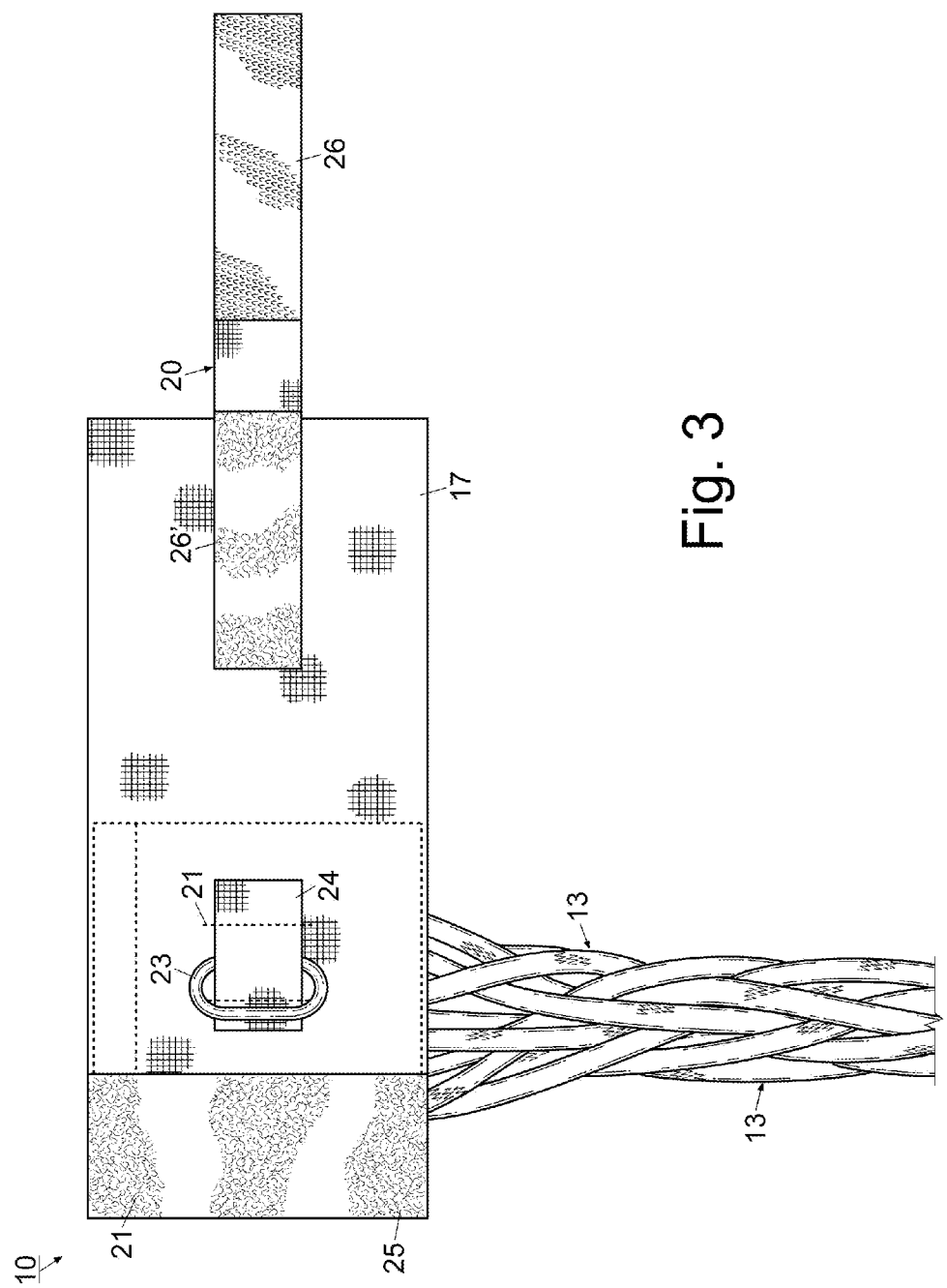
FIG. 3 depicts a rear plan view of the mooring cuff of FIG. 2.
Figure 4:
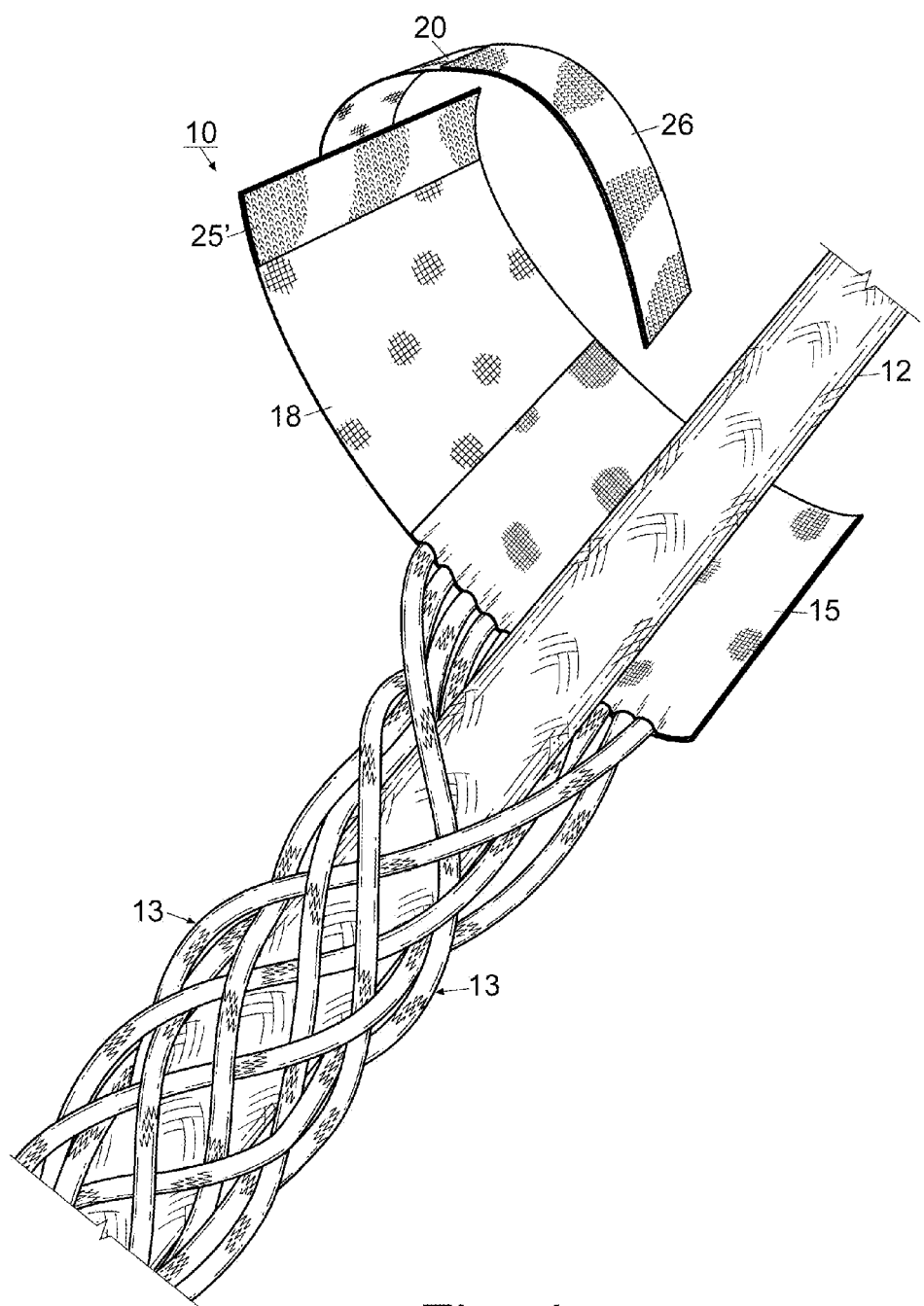
FIG. 4 demonstrates a side perspective view of the mooring line cuff of FIG. 1 in the open position.

FIG. 3 shows the opposing, exterior (i.e. mooring line 12 distal) rear plan view of rope cuff 10 as presented in FIG. 2. Cuff exterior 17 is preferably formed from the same material as cuff interior 16 and cuff base 18 and serves as a mounting surface for strap 20 that engages ring 23 to close and secure rope cuff 10 around mooring line 12. Strap 20 may include complementary hook and loop material 26, 26' at opposing ends, such that when strap 20 is passed through ring 23 and doubled over upon itself as is known in the art, hook and loop material 26, 26' engages and the constricting force is not dissipated. Ring 23 may be affixed to cuff exterior 17 via adhesive, fasteners, or the like but is preferably connected to strip 24 that is stitched to rope cuff 10 in a similar fashion as shoring lines 13 (see stitches 21). Rope cuff 10 may also include complementary hook and loop sections 25, 25' to further secure mooring line 12 within rope cuff 10. As is represented in FIGS. 1 and 4, rope cuff 10 is wrapped around mooring line 12, and hook section 25' (FIG. 2) frictionally engages loop section 25 (FIG. 3) as is understood. It should be appreciated that embodiments of rope cuff 10 may include different materials for securing rope cuff 10 and mooring line 12 and the foregoing examples should not be viewed as limiting the scope of the instant invention.

FIG. 4 illustrates rope cuff 10 being secured to mooring line 12. A method of affixing braided shoring lines 13 to mooring line 12 may include the steps of providing removable rope cuff 10 which includes interior flap 15 positioned on cuff interior 16 and folded over shoring lines 13 which are frictionally engaged with hook material 22, and hook and loop strap 20 that engages ring 23 which are respectively positioned on cuff exterior 17. Mooring line 12 is placed along cuff interior 16 and contacting interior flap 15 as seen in FIG. 4 as shoring lines 13 are braided around mooring line 12 to prevent destructive rubbing and abrasions from docks, vessels, or other mounting surfaces. Shoring lines 13 are sewn into rope cuff 10 with stitches 21 and under interior flap 15 to tightly engage hook material 22. Rope cuff 10 is pulled tight around mooring line 12 and hook and loop sections 25, 25' are complementarily engaged to prevent loosening of rope cuff 10. Strap 20 is passed through ring 23 and doubled over on itself, engaging strap hook and loop sections 26, 26'.

The illustrations and examples provided herein are for explanatory purposes and are not intended to limit the scope of the appended claims.

We claim:

1. An adjustable mooring line cuff comprising a plurality of shoring lines braided around a mooring line and affixed to an interior surface of the cuff, and an interior flap defined by a friction material positioned on the interior surface of the cuff to engage the mooring line and prevent displacement of the cuff.

2. The cuff of claim 1 further comprising a hook and loop strap attached to an exterior surface of the cuff via a strip.

3. The cuff of claim 2 further comprising a ring attached to the exterior surface and sized to receive the hook and loop strap therein.

4. The cuff of claim 1 wherein the interior flap is secured to the interior surface of the cuff and over the plurality of shoring lines.

5. The cuff of claim 1 further comprising a section of hook material positioned on the interior surface of the cuff and a section of loop material positioned on an exterior surface of the cuff and oriented such that the hook material and loop material frictionally engage one another when the cuff is wrapped around the mooring line.

6. The cuff of claim 1 wherein the cuff is formed from woven nylon.

7. The cuff of claim 1 wherein the interior flap is formed from hook and loop material.

8. The cuff of claim 1 wherein the interior flap is formed from a material defining a plurality of fingers.

9. An adjustable mooring line cuff comprising a plurality of shoring lines positioned around a mooring line and affixed to a first surface of the cuff, and a flap defined by a friction material positioned on the first surface of the cuff to engage the mooring line and prevent displacement of the cuff.

10. The cuff of claim 9 further comprising a strap attached to a second surface of the cuff.

11. The cuff of claim 10 wherein the strap defines a hook section and a loop section.

12. The cuff of claim 10 further comprising a ring attached to the second surface and sized to receive the strap therein.

13. The cuff of claim 9 wherein the flap is secured to the first surface of the cuff and over the plurality of shoring lines, the first surface defined as an interior surface of the cuff.

14. The cuff of claim 9 wherein the cuff is formed from woven nylon.

15. The cuff of claim 9 wherein the flap is formed from hook and loop material.

16. The cuff of claim 9 wherein the flap is formed from a material defining a plurality of fingers.

\* \* \* \* \*